(No Model.) 2 Sheets—Sheet 2.
J. G. SHERMAN.
SULKY PLOW.
No. 268,737. Patented Dec. 5, 1882.
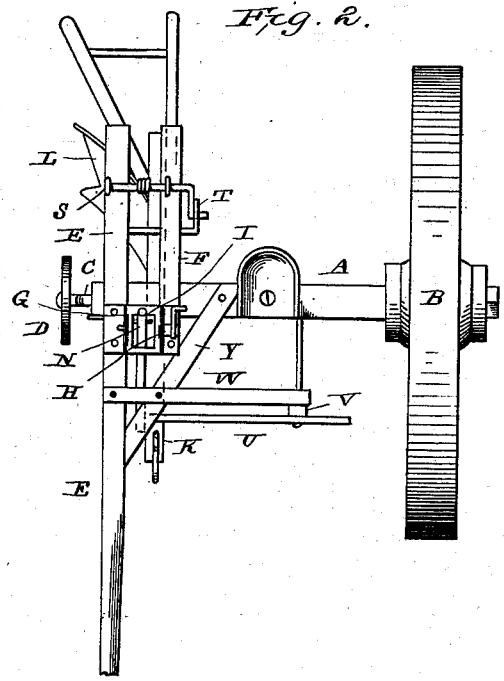
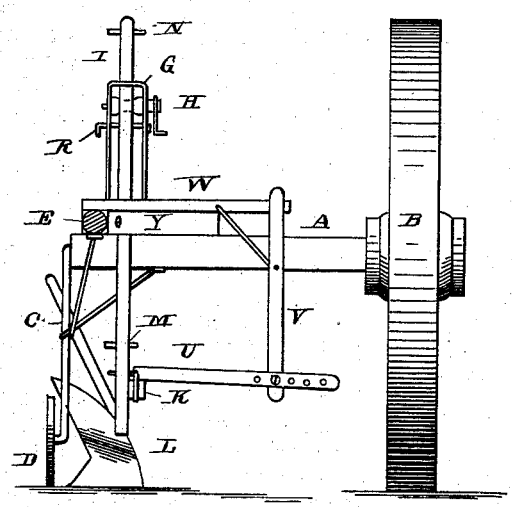

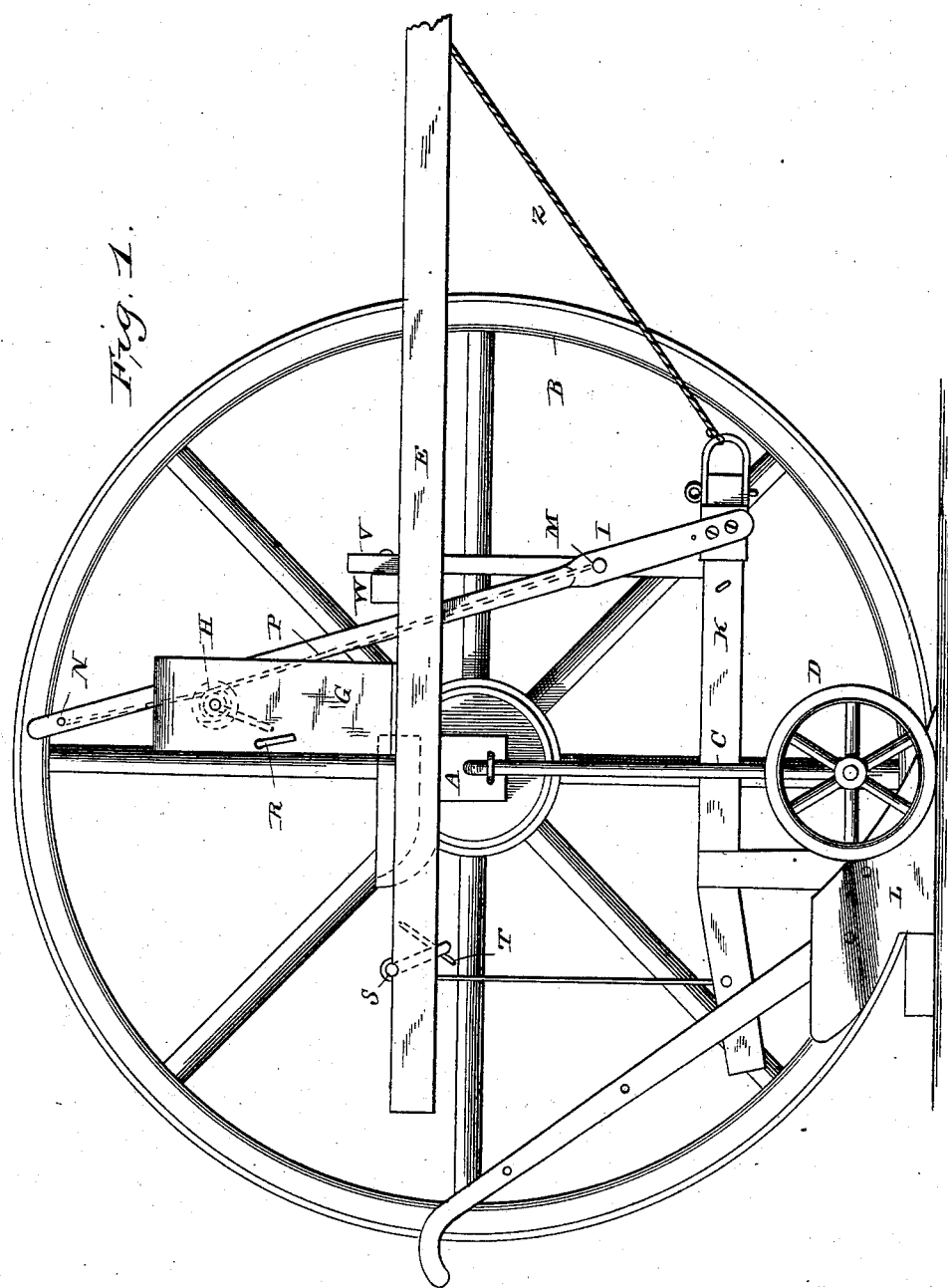

UNITED STATES PATENT OFFICE.

JEREMIAH G. SHERMAN, OF McHENRY, ILLINOIS, ASSIGNOR OF ONE-HALF TO SAMUEL S. SHERMAN, OF SAME PLACE.

SULKY-PLOW.

SPECIFICATION forming part of Letters Patent No. 268,737, dated December 5, 1882.

Application filed June 19, 1882. (No model.)

*To all whom it may concern:*

Be it known that I, JEREMIAH G. SHERMAN, of McHenry, in the county of McHenry, and in the State of Illinois, have invented certain new and useful Improvements in Sulky-Plows; and I do hereby declare that the following is a full, clear, and exact description thereof, reference being had to the accompanying drawings, and to the letters of reference marked thereon, making a part of this specification.

This invention relates to certain improvements in sulky-plows; and it has for its objects to provide for hanging the plow in the sulky-frame in such manner that it may move as freely as when directly employed—that is, when the horses or animals are hitched directly to the clevis—and also to provide improved means for regulating the position of the plow, as more fully hereinafter specified. These objects I accomplish by the means illustrated in the accompanying drawings, in which—

Figure 1 represents a side elevation, Fig. 2 a top view, and Fig. 3 a front elevation, of my improved sulky-plow.

The letter A indicates the axle of the frame, which at one end is provided with a large wheel, B, and at the other with a vertical extension, C, which has mounted at its lower end a small wheel, D.

The letter E indicates the tongue, and F a beam parallel therewith and secured to the axle. The tongue and beam support an upright frame, G, in which is mounted a windlass, H.

I indicates a bar extending through an opening in the top of the frame, its lower end being loosely secured to the plow-beam K of the plow L. To the said bar is secured at the points M N a rope, P, which passes over the windlass H.

The letter R indicates a stop adapted to engage the crank of the windlass and hold it in any desired position.

The letter S indicates a windlass provided with a rope, which is attached to the plow-beam near its rear end; and T, a stop, by means of which the crank of the windlass may be held when required. The plow may be of the ordinary or any approved description.

The letter U indicates a bar loosely connected at one end to the upright bar before mentioned. The said bar is provided with a series of apertures, by means of which it may be adjustably secured to the lower end of a dependent rod or bar, V, secured to a horizontal beam, W, which is secured to the tongue and to an oblique brace-beam, Y. The clevis of the plow has secured to it a rope, Z, by means of which the plow may be connected with the forward end of the tongue.

The operation of my invention is as follows: The forward end of the plow-beam is elevated or depressed by means of the forward pulley, the connecting-rope, and inclined rod, the rear end being elevated by the rear pulley and rope, it being depressed by its own weight. The plow is adjusted laterally by means of the perforated rod U and the pin or screw, which enters an aperture at the lower end of the bar V.

Having described my invention, what I claim, and desire to secure by Letters Patent, is—

1. In combination with the frame and the plow, the forward windlass and the oblique bar, connected directly to the forward end of the plow-beam and having a rope passing around the windlass, and the stop for holding the windlass, substantially as and for the purposes specified.

2. In combination with the frame and the plow, the forward windlass and oblique bar, connected to the plow-beam and the rope and forward windlass, and the rear windlass and rope and stops for holding said windlasses, all arranged substantially as specified.

In testimony whereof I affix my signature, in presence of two witnesses, this 31st day of May, 1882.

JEREMIAH G. SHERMAN.

Witnesses:
JAMES B. PERRY,
O. N. OWEN.